United States Patent
Cho et al.

(10) Patent No.: US 12,113,256 B2
(45) Date of Patent: *Oct. 8, 2024

(54) SOLID ELECTROLYTE MEMBRANE AND USE THEREOF IN BATTERIES

(71) Applicants: North Carolina Agricultural and Technical State University, Greensboro, NC (US); The University of North Carolina at Greensboro, Greensboro, NC (US)

(72) Inventors: Sung-Jin Cho, Summerfield, NC (US); Alla Letfullina, Greensboro, NC (US)

(73) Assignees: North Carolina Agricultural and Technical State University, Greensboro, NC (US); The University of North Carolina at Greensboro, Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/993,644

(22) Filed: Nov. 23, 2022

(65) Prior Publication Data
US 2023/0086265 A1  Mar. 23, 2023

Related U.S. Application Data

(63) Continuation of application No. 16/253,940, filed on Jan. 22, 2019, now Pat. No. 11,515,556.
(Continued)

(51) Int. Cl.
*H01M 8/124* (2016.01)
*H01M 4/02* (2006.01)
(Continued)

(52) U.S. Cl.
CPC ............. *H01M 8/124* (2013.01); *H01M 4/02* (2013.01); *H01M 4/8673* (2013.01);
(Continued)

(58) Field of Classification Search
CPC ......... H01M 10/0525; H01M 10/0568; H01M 10/0569; H01M 2004/027;
(Continued)

(56) References Cited

U.S. PATENT DOCUMENTS 5,219,679 A   6/1993  Abraham et al.
5,589,295 A   12/1996 Derzon et al.
(Continued)

FOREIGN PATENT DOCUMENTS

CN    103208654 A    7/2013
CN    105826603 A    8/2016
(Continued)

OTHER PUBLICATIONS

Abu-Lebdeh, Y., et al., "New electrolytes based on glutaronitrile for high energy/power Li-ion batteries", Journal of Power Sources, vol. 189, No. 1, 2009, pp. 576-579.
(Continued)

*Primary Examiner* — Victoria H Lynch
(74) *Attorney, Agent, or Firm* — Jenkins, Taylor & Hunt, P.A.

(57) ABSTRACT

The presently disclosed subject matter relates generally to a highly ionically conductive solid electrolyte membrane and to batteries comprising such solid electrolyte membrane.

15 Claims, 7 Drawing Sheets

Related U.S. Application Data (60) Provisional application No. 62/620,072, filed on Jan. 22, 2018.

(51) Int. Cl.
  *H01M 4/86* (2006.01)
  *H01M 8/1004* (2016.01)
  *H01M 8/10* (2016.01)

(52) U.S. Cl.
  CPC .... *H01M 8/1004* (2013.01); *H01M 2004/027* (2013.01); *H01M 2004/028* (2013.01); *H01M 4/8668* (2013.01); *H01M 2008/1095* (2013.01)

(58) Field of Classification Search
  CPC ... H01M 2004/028; H01M 2008/1095; H01M 2300/0022; H01M 2300/0028; H01M 2300/0085; H01M 4/02; H01M 4/8668; H01M 4/8673; H01M 8/1004; H01M 8/124; Y02E 60/10
  See application file for complete search history.

(56) References Cited

U.S. PATENT DOCUMENTS

| | | | |
|---|---|---|---|
| 6,290,878 | B1 | 9/2001 | Hilaire et al. |
| 8,568,923 | B1 | 10/2013 | Kim et al. |
| 11,515,556 | B1 | 11/2022 | Cho et al. |
| 2014/0065513 | A1 | 3/2014 | Badding et al. |
| 2016/0064770 | A1 | 3/2016 | Lee et al. |
| 2017/0162911 | A1 | 6/2017 | Gaben |
| 2017/0250404 | A1 | 8/2017 | Cho |
| 2017/0331092 | A1 | 11/2017 | Chen et al. |
| 2018/0269483 | A1 | 9/2018 | Cho |
| 2018/0337417 | A1* | 11/2018 | Kyu ............... H01M 4/8668 |
| 2019/0027724 | A1* | 1/2019 | Xing ............. H01M 10/0562 |
| 2020/0235427 | A1* | 7/2020 | Kim ................. H01M 4/624 |
| 2020/0335814 | A1 | 10/2020 | Lin et al. |
| 2021/0083317 | A1 | 3/2021 | Yang et al. |
| 2021/0194052 | A1 | 6/2021 | Oh et al. |
| 2022/0352562 | A1 | 11/2022 | Cho et al. |

FOREIGN PATENT DOCUMENTS

| | | |
|---|---|---|
| CN | 108963332 A | 12/2018 |
| CN | 111740156 A | 10/2020 |
| CN | 111740157 A | 10/2020 |
| DE | 102014113833 A1 | 3/2016 |
| WO | WO2008/138132 A1 | 11/2008 |
| WO | WO2016/049014 A1 | 3/2016 |
| WO | WO2019/104193 A1 | 5/2019 |
| WO | WO2021/225831 A1 | 11/2021 |

OTHER PUBLICATIONS

Chen, B., et al., "A new composite solid electrolyte PEO/Li10GeP2S12/SN for all-solid-state lithium battery", Electrochimica Acta, vol. 210, 2016, pp. 905-914.

Dahbi, M., et al., "Electrochemical lithiation and compatibility of graphite anode using glutaronitrile/dimethyl carbonate mixtures containing LiTFSI as electrolyte", Journal of Applied Electrochemistry, vol. 43, No. 4, 2013, pp. 375-385.

Geirhos, K., et al., "Communication: Conductivity enhancement in plastic-crystalline solid-state electrolytes", The Journal of Chemical Physics, AIP Publishing, vol. 143, No. 8, 2015, 5 pages.

Sun, C., et al., "Recent advances in all-solid-state rechargeable lithium batteries", Nano Energy, vol. 33, 2017, pp. 363-386.

Yue, L., et al., "All solid-state polymer electrolytes for high-performance lithium ion batteries", Energy Storage Materials, vol. 5, 2016, pp. 139-164.

Zachariah, M., et al., "Self-Diffusion, Phase Behavior, and Li+ Ion Conduction in Succinonitrile-Based Plastic Cocrystals", The Journal of Physical Chemistry C, vol. 119, No. 49, 2015, pp. 27298-27306.

Non-Final Office dated Oct. 6, 2020, in U.S. Appl. No. 16/253,940, 10 pages.

Final Office Action dated Aug. 13, 2021 in U.S. Appl. No. 16/253,940, 13 pages.

Advisory Action dated Nov. 1, 2021 in U.S. Appl. No. 16/253,940, 3 pages.

Non-Final Office Action dated Feb. 9, 2022 in U.S. Appl. No. 16/253,940, 15 pages.

Notice of Allowance dated Jul. 14, 2022 in U.S. Appl. No. 16/253,940, 9 pages.

Supplemental Notice of Allowability Oct. 19, 2022 in U.S. Appl. No. 16/253,940, 2 pages.

\* cited by examiner

SOLID ELECTROLYTE MEMBRANE AND USE THEREOF IN BATTERIES

RELATED APPLICATIONS

This application is a continuation of U.S. patent application Ser. No. 16/253,940, filed Jan. 22, 2019, incorporated herein by reference in its entirety, which claims priority to and the benefit of U.S. Provisional Patent Application Ser. No. 62/620,072, filed Jan. 22, 2018; the disclosure of which is also incorporated herein by reference in its entirety.

TECHNICAL FIELD

The presently disclosed subject matter relates generally to a highly ionically conductive solid electrolyte membrane and to batteries comprising such an electrolyte.

BACKGROUND

As society has grown ever more dependent on reliable and continuous supply of power, demands for a powerful and safe battery have risen in the last decade. Current state of the art lithium-ion batteries cannot be the sole technology to address these needs, as they are challenged by inclusion of a flammable liquid electrolyte.

Accordingly, there exists a need for a thermally and electrochemically stable solid-state electrolyte (SSEs). There are several examples of SSEs: solid ceramic electrolytes (SCE), solid polymer electrolytes (SPE), and hybrid polymer electrolytes (HPE). Each of these types have known advantages and disadvantages. SCEs can reach ionic conductivities of $10^{-2}$ S/cm, but can suffer from interface impedance between electrodes, as well as brittleness and difficulties in processability. SPEs only generally reach ionic conductivities of $10^{-5}$ S/cm at room temperature, although they can show good contact with electrodes, good processability, applicability, and cost effectiveness. Hybrid polymer electrolytes, which typically employ SCEs as fillers for SPEs, demonstrate the benefits of SPEs and exhibit ionic conductivities of $10^{-4}$ S/cm at room temperature, but only reach ionic conductivities well below currently employed liquid electrolytes. Plastic crystals are a class of materials exhibiting plastic behavior while preserving long-range molecular order. Although incorporating plastic crystals within SPEs yields good ionic conductivities, plastic crystal-based electrolytes suffer from poor cyclability. Thus far, no solid-state electrolyte has demonstrated stable cycling at ambient temperature and high current rates (>0.3 C) in a battery cell.

Consequently, there remains a need for a highly ionically conductive solid electrolyte membrane having good cyclability and to a battery comprising such an electrolyte that does not suffer from the limitations identified herein.

SUMMARY

In some embodiments, the presently disclosed subject matter provides a highly ionically conductive solid electrolyte membrane. In some embodiments, the presently disclosed subject matter provides a battery comprising a highly ionically conductive solid electrolyte membrane.

In some embodiments, the presently disclosed subject matter provides a solid electrolyte membrane comprising glutaronitrile, a nitrile-containing polymer, and a non-polarizable lithium salt.

In some embodiments, the non-polarizable lithium salt is lithium hexafluorophosphate, lithium tetrafluoroborate, and/or lithium perchlorate. In other embodiments, the non-polarizable lithium salt is lithium hexafluorophosphate or lithium tetrafluoroborate; alternately, the lithium salt is lithium hexafluorophosphate. In some embodiments, the concentration of the non-polarizable lithium salt is between about 0.5 M and 2.0 M in the solution from which the solid electrolyte membrane is cast. In some embodiments, the concentration of the non-polarizable lithium salt in the cast solution is between about 1.0 M and 1.5 M. Alternately, the concentration of the non-polarizable lithium salt is between about 2.5 wt. % and about 15 wt %. In some embodiments, the concentration of the non-polarizable lithium salt is between about 5 wt % and about 10 wt. % or between about 5.4 wt % and about 8.1 wt %.

In some embodiments, the nitrile-containing polymer is polymethacrylonitrile (PMAN), polyacrylonitrile (PAN), or a combination thereof. In some embodiments, the polymer is PMAN. In some embodiments, the polymer is PAN. In other embodiments, the polymer is a combination of PMAN and PAN. When the polymer is a combination of PMAN and PAN, the polymer may comprise a 0:100 ratio of PMAN:PAN. Alternately, the ratio may be 10:90, 20:80, 30:70, 40:60, 50:50, 60:40, 70:30, 80:20, 90:10 or 100:0.

In some embodiments, the solid electrolyte membrane further comprises one or more fillers selected from the group of $Li_{1.3}Al_{0.3}Ti_{1.7}(PO_4)_3$, $Li_{1.5}Al_{0.5}Ge_{1.5}(PO_4)_3$, $Li_7La_3Zr_2O_{12}$, $Li_{0.33}La_{0.557}TiO_3$, $Li_2O$—$SiO_2$—$TiO_2$—$P_2O_5$, $Al_2O_3$, $SiO_2$, $TiO_2$, $BaTiO_3$, $Ta_2O_5$, $ZrO_2$, $Si_3N_4$, SiC, $PbTiO_3$, $LiNbO_3$, AlN, and $Y_2O_3$. In some embodiments, the filler is $Li_{1.3}Al_{0.3}Ti_{1.7}(PO_4)_3$, $Li_{1.5}Al_{0.5}Ge_{1.5}(PO_4)_3$, $Li_7La_3Zr_2O_{12}$, $Li_{0.33}La_{0.557}TiO_3$, and/or $Li_2O$—$SiO_2$—$TiO_2$—$P_2O_5$. In other embodiments the filler is $Al_2O_3$, $SiO_2$, $TiO_2$, $BaTiO_3$, $Ta_2O_5$, $ZrO_2$, $Si_3N_4$, SiC, $PbTiO_3$, $LiNbO_3$, AlN, and/or $Y_2O_3$. In some variations, the filler is $SiO_2$, $TiO_2$, and/or $Al_2O_3$.

In some embodiments, the presently disclosed subject matter provides a highly ionically conductive solid electrolyte membrane that does not contain lithium trimethylsulfonate or lithium bis(trifluromethylsulfonyl)imide.

In some embodiments, the presently disclosed subject matter provides a highly ionically conductive solid electrolyte membrane having an ionic conductivity of at least about $1 \times 10^{-3}$ S cm$^{-1}$ at 22.6° C.

In some embodiments, the solid electrolyte membrane is no more than 50 μm thick; alternately, the membrane is no more than 100 μm thick. In some variations, the membrane is between about 40 μm and 80 μm thick; alternately, the membrane is between about 40 μm and 60 μm thick.

In some embodiments, the presently disclosed subject matter provides a highly ionically conductive solid electrolyte membrane comprising between about 5 wt. % and about 35 wt. % glutaronitrile; alternately, the membrane comprises between about 15 wt. % and about 25 wt. % glutaronitrile. In one variation, the membrane comprises about 20 wt. % glutaronitrile, in another variation, the membrane comprises about 25 wt. % glutaronitrile.

In one variation of any disclosed embodiment, the membrane contains no succinonitrile.

In another variation of any disclosed embodiment, the nitrile-containing polymer is PAN. In another variation of any disclosed embodiment, the non-polarizable lithium salt is $LiPF_6$.

In some embodiments, the presently disclosed subject matter provides a battery comprising a solid electrolyte membrane as disclosed herein, a positive electrode and a negative electrode. In some embodiments, the non-polarizable lithium salt is lithium hexafluorophosphate, lithium tetrafluoroborate, and/or lithium perchlorate. In some embodiments, the membrane further comprises $SiO_2$, $TiO_2$, and/or $Al_2O_3$.

In some embodiments, the presently disclosed subject matter provides a battery comprising a solid electrolyte membrane disclosed herein that is electrochemically stable over the range 0 V to 6 V. In other embodiments, the solid electrolyte membrane is stable over the range 1 V to 5 V.

In some embodiments, the presently disclosed subject matter provides a battery having a capacity (mAh/g) after 40 cycles that is within about 10% the measured capacity of the first cycle. In one such example, the battery comprises a cathode comprising $LiNi_{0.6}Mn_{0.2}Co_{0.2}O_2$ (NMC622) and the anode comprises graphite.

In another embodiment, the battery capacity after 40 cycles is within about 5% the capacity of the first cycle. In another variation, a battery of the presently disclosed subject matter has a capacity retention after at least about 40 cycles that is at least about 95%.

Accordingly, it is an object of the presently disclosed subject matter to disclose a highly ionically conductive solid electrolyte membrane having good cyclability and batteries comprising such a solid electrolyte membrane.

An object of the presently disclosed subject matter having been stated hereinabove, and which is achieved in whole or in part by the presently disclosed subject matter, other objects will become evident as the description proceeds when taken in connection with the accompanying drawings as best described herein below.

BRIEF DESCRIPTION OF THE DRAWINGS

A better understanding of the features and advantages of the presently disclosed subject matter will be obtained by reference to the following detailed description that sets forth illustrative embodiments, in which the principles of the presently disclosed subject matter are utilized, and the accompanying drawings of which.

DETAILED DESCRIPTION

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used herein, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or."

As used herein "another" can mean at least a second or more.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods. Accordingly, unless indicated to the contrary, the numerical parameters set forth in this specification and attached claims are approximations that can vary depending upon the desired properties sought to be obtained by the presently disclosed subject matter.

As used herein, a "polarizable" lithium salt refers to a lithium-containing salt that has an anion that can form instantaneous dipoles. As used herein, "polarizable lithium salts" include, but are not limited to, lithium trifluoromethylsulfonate and lithium bis(trifluoromethylsulfonyl)imide. According to one embodiment, disclosed herein is a solid electrolyte membrane that does not comprise a polarizable lithium salt. As used herein "non-polarizable lithium salts" include, but are not limited to, lithium hexaflurophosphate, lithium tetrafluoroborate, and lithium perchlorate. According to one embodiment, disclosed herein is a solid electrolyte membrane that does comprises a non-polarizable lithium salt. In one embodiment, the lithium salt is lithium hexaflurophosphate and/or lithium tetrafluoroborate.

As used herein "electrochemical stability" of a battery means that the electrolyte does not rapidly decompose over the operational voltage range of the battery. Electrochemical stability can be assessed by measuring the current of a battery over a voltage range. As used herein, a battery that has a measured current over 0.5 mA when measured over a range of about 1-5 V open circuit voltage at a 10 mV/s scan rate is electrochemically unstable. In some examples, an electrochemically stable battery has a current of no more than about 0.4 mA, no more than about 0.3 mA, or no more than about 0.2 mA. In some examples, the electrochemical stability is measured over a range of about 0-6 V open circuit voltage at a 10 mV/s scan rate. As disclosed herein, a coin cell battery evaluated in this manner comprises a membrane of the presently disclosed subject matter sandwiched between two lithium cells (i.e. lithium metal used as counter, reference and working electrodes). Thus, a battery with a measured current of no more than 0.3 mA over a range of 1-5 V or 0-6 V is electrochemically stable.

As used herein, "battery component" or "battery unit" or "energy storage device" includes, but is not limited to, a positive electrode (cathode) and a negative electrode (anode), receiving and transmitting coils, diodes, switches, transistors, and similar electrical components.

Glutaronitrile (GN) comprises two nitrile groups and a central C—C—C chain. GN is both thermally stable (boiling point 287° C. and electrochemically stable (e.g. in the range of 2.8 to 5 V) and exhibits high electron affinity due to its nitrile groups. As shown herein, GN can be incorporated into a polyacrylonitrile matrix containing a lithium salt that is not polarizable to yield a solid electrolyte membrane. The electrolyte membrane benefits from both the high ionic conductivity of glutaronitrile and PAN's mechanical integrity, as well as electrochemical and thermal stability. The membrane electrolyte is sturdy, flexible and possesses an ionic conductivity of $10^{-3}$ S/cm at room temperature. Moreover, the membranes of the presently disclosed subject matter showed excellent cycling performance at room temperature with various types of electrodes in both coin cell and pouch cell configurations.

Solid Electrolyte Membrane and Batteries Containing Same

In some embodiments, the presently disclosed subject matter provides a highly ionically conductive solid electrolyte membrane. In some embodiments, the presently disclosed subject matter provides a battery comprising a highly ionically conductive solid electrolyte membrane.

In some embodiments, the presently disclosed subject matter provides a solid electrolyte membrane comprising glutaronitrile, a nitrile-containing polymer, and a non-polarizable lithium salt.

In some embodiments, the non-polarizable lithium salt is lithium hexafluorophosphate, lithium tetrafluoroborate, and/or lithium perchlorate. In other embodiments, the non-polarizable lithium salt is lithium hexafluorophosphate or lithium tetrafluoroborate; alternately, the lithium salt is lithium hexafluorophosphate. In some embodiments, the concentration of the non-polarizable lithium salt is between about 0.5 M and 2.0 M in the solution from which the solid electrolyte membrane is cast. In some embodiments, the concentration of the non-polarizable lithium salt in the cast solution is between about 1.0 M and 1.5 M. Alternately, the concentration of the non-polarizable lithium salt is between about 2.5 wt. % and about 15 wt %. In some embodiments, the concentration of the non-polarizable lithium salt is between about 5 wt % and about 10 wt. % or between about 5.4 wt % and about 8.1 wt %.

In some embodiments, the nitrile-containing polymer is polymethacrylonitrile (PMAN), polyacrylonitrile (PAN), or a combination thereof. In some embodiments, the polymer is PMAN. In some embodiments, the polymer is PAN. In other embodiments, the polymer is a combination of PMAN and PAN. When the polymer is a combination of PMAN and PAN, the polymer may comprise a 0:100 ratio of PMAN:PAN. Alternately, the ratio may be 10:90, 20:80, 30:70, 40:60, 50:50, 60:40, 70:30, 80:20, 90:10 or 100:0.

In some embodiments, the solid electrolyte membrane further comprises one or more fillers selected from the group of $Li_{1.3}Al_{0.3}Ti_{1.7}(PO_4)_3$, $Li_{1.5}Al_{0.5}Ge_{1.5}(PO_4)_3$, $Li_7La_3Zr_2O_{12}$, $Li_{0.33}La_{0.557}TiO_3$, $Li_2O-SiO_2-TiO_2-P_2O_5$, $Al_2O_3$, $SiO_2$, $TiO_2$, $BaTiO_3$, $Ta_2O_5$, $ZrO_2$, $Si_3N_4$, $SiC$, $PbTiO_3$, $LiNbO_3$, $AlN$, and $Y_2O_3$. In some embodiments, the filler is $Li_{1.3}Al_{0.3}Ti_{1.7}(PO_4)_3$, $Li_{1.5}Al_{0.5}Ge_{1.5}(PO_4)_3$, $Li_7La_3Zr_2O_{12}$, $Li_{0.33}La_{0.557}TiO_3$, and/or $Li_2O-SiO_2-TiO_2-P_2O_5$. In other embodiments the filler is $Al_2O_3$, $SiO_2$, $TiO_2$, $BaTiO_3$, $Ta_2O_5$, $ZrO_2$, $Si_3N_4$, $SiC$, $PbTiO_3$, $LiNbO_3$, $AlN$, and/or $Y_2O_3$. In some variations, the filler is $SiO_2$, $TiO_2$, and/or $Al_2O_3$.

In some embodiments, the presently disclosed subject matter provides a highly ionically conductive solid electrolyte membrane that does not contain lithium trimethylsulfonate or lithium bis(trifluromethylsulfonyl)imide.

In some embodiments, the presently disclosed subject matter provides a highly ionically conductive solid electrolyte membrane having an ionic conductivity of at least about $1 \times 10^{-3}$ S cm$^{-1}$ at 22.6° C.

In some embodiments, the solid electrolyte membrane is no more than 50 μm thick; alternately, the membrane is no more than 100 μm thick. In some variations, the membrane is between about 40 μm and 80 μm thick; alternately, the membrane is between about 40 μm and 60 μm thick.

In some embodiments, the presently disclosed subject matter provides a highly ionically conductive solid electrolyte membrane comprising between about 5 wt. % and about 35 wt. % glutaronitrile; alternately, the membrane comprises between about 15 wt. % and about 25 wt. % glutaronitrile. In one variation, the membrane comprises about 20 wt. % glutaronitrile, in another variation, the membrane comprises about 25 wt. % glutaronitrile.

In one variation of any disclosed embodiment, the membrane contains no succinonitrile.

In another variation of any disclosed embodiment, the nitrile-containing polymer is PAN. In another variation of any disclosed embodiment, the non-polarizable lithium salt is LiPF$_6$.

In some embodiments, the presently disclosed subject matter provides a battery comprising a solid electrolyte membrane as disclosed herein, a positive electrode and a negative electrode. In some embodiments, the non-polarizable lithium salt is lithium hexafluorophosphate, lithium tetrafluoroborate, and/or lithium perchlorate. In some embodiments, the membrane further comprises SiO$_2$, TiO$_2$, and/or Al$_2$O$_3$.

In some embodiments, the presently disclosed subject matter provides a battery comprising a solid electrolyte membrane disclosed herein that is electrochemically stable over the range 0 V to 6 V. In other embodiments, the solid electrolyte membrane is stable over the range 1 V to 5 V.

In some embodiments, the presently disclosed subject matter provides a battery having a capacity (mAh/g) after 40 cycles that is within about 10% the measured capacity of the first cycle. In one such example, the battery comprises a cathode comprising LiNi$_{0.6}$Mn$_{0.2}$Co$_{0.2}$O$_2$ (NMC622) and the anode comprises graphite.

In another embodiment, the battery capacity after 40 cycles is within about 5% the capacity of the first cycle. In another variation, a battery of the presently disclosed subject matter has a capacity retention after at least about 40 cycles that is at least about 95%.

In some embodiments, the presently disclosed subject matter provides a highly ionically conductive solid electrolyte membrane. In some embodiments, the presently disclosed subject matter provides a method for the preparation of a highly ionically conductive solid electrolyte membrane. In some embodiments, the presently disclosed subject matter provides a battery comprising a highly ionically conductive solid electrolyte membrane.

In some embodiments, the solid electrolyte membrane does not contain a polarizable lithium salt. In some embodiments, the solid electrolyte membrane comprises glutaronitrile (GN). In other embodiments, the solid electrolyte membrane comprises glutaronitrile in combination with succinonitrile (SN). In one variation of any disclosed embodiment, the solid electrolyte membrane is free of SN. In some embodiments, the solid electrolyte membrane comprises a nonpolarizable lithium salt, such as lithium hexafluorophosphate (LiPF$_6$) or lithium tetrafluoroborate (LiBF$_4$). In other embodiments, the solid electrolyte membrane comprises a nitrile-containing polymer, such as polyacrylonitrile (PAN) or polymethyacrylonitrile (PMAN). In some embodiments, the solid electrolyte membrane comprises a filler, including but not limited to Li$_{1.3}$Al$_{0.3}$Ti$_{1.7}$(PO$_4$)$_3$ (LATP), Li$_{1.3}$Al$_{0.3}$Ge$_{1.7}$(PO$_4$)$_3$ (LAGP), Li$_7$La$_3$Zr$_2$O$_{12}$ (LLZO), and/or Al$_2$O$_3$. In some embodiments, disclosed herein is a highly ionically conductive solid electrolyte membrane comprising GN, LiPF$_6$, and PAN. Alternately, disclosed herein is a highly ionically conductive solid electrolyte membrane comprising GN, SN, LiPF$_6$, and PAN. In other embodiments, disclosed herein is a highly ionically conductive solid electrolyte membrane comprising GN, LiPF$_6$, PAN, and a filler. In other embodiments, disclosed herein is a highly ionically conductive solid electrolyte membrane comprising GN, SN, LiPF$_6$, PAN, and a filler.

In some embodiments, disclosed herein is a highly ionically conductive solid electrolyte membrane consisting of GN, LiPF$_6$, PAN and ethylene carbonate (EC). Alternately, disclosed is a highly ionically conductive solid electrolyte membrane consisting of GN, SN, LiPF$_6$, PAN, EC and a filler.

In some embodiments, the presently disclosed subject matter provides a method for the preparation of a highly ionically conductive solid electrolyte membrane. As generally described herein the following method can be conducted in ambient atmosphere; an inert atmosphere is not needed. According to some embodiments of the methods disclosed herein, PAN is added to melted ethylene carbonate (EC), generally in an amount sufficient to form a 5-20% PAN solution, most typically a 10-15% PAN solution. A non-polarizable lithium salt, such as LiPF$_6$, is dissolved in melted EC in an amount sufficient for between about a 0.5 M and a 2.5 M solution of the non-polarizable lithium salt. The lithium/EC solution is then added to the PAN/EC mixture. Glutaronitrile, at between about 10 wt. % and about 40 wt. % is added to the mixture, typically between about 15 wt. % and about 35 wt. %. Alternately, about 20 wt. % to 30 wt. % glutaronitrile is added to the mixture. At this point, melted succinonitrile, between about 5 wt % and about 25 wt % can be added to the solution if desired.

In some embodiments, a filler, such as ceramic filler, such as between about 1 wt. % and about 10 wt. % is added to the solution, generally using ball milling. Alternately, between about 2 wt. % and 5 wt %, in one variation about 3 wt. % filler is added.

The mixture, with or without a filler, such as a ceramic filler, dispersed therein, can be cast onto a substrate, such as aluminum foil using a doctor blade, typically with a gap of less than 100 μm. The cast electrolyte is then dried for 12 hours at ambient temperature while exposed to the atmosphere. The dried membrane is typically between about 40 μm and 80 μm thick; alternately, the membrane is between about 40 μm and 60 μm thick. Generally, the dried membrane is about 45 μm thick. The dried membrane can be stored exposed to air or under an inert atmosphere. In some embodiments, the presently disclosed subject matter provides a solid electrolyte membrane cast from solution comprising: (a) polyacrylonitrile; (b) between about 5 wt. % and about 10 wt % non-polarizable lithium salt; and (c) between about 20 wt. % and about 30 wt. % glutaronitrile. In some embodiments the cast solution further contains ethylene carbonate.

EXAMPLES

The following Examples have been included to provide guidance and illustrations to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Material Characterization

Membrane morphology was characterized via scanning electron microscopy (SEM) images.

Energy dispersive X-ray spectroscopy (EDS) was used to evaluate the dispersion of LiTFSI in PAN.

Ionic conductivity was measured using electrochemical impedance spectroscopy (EIS) at a frequency range of 10 Hz-1 MHz and a voltage amplitude of 100 mV using two gold coated copper electrodes or as disclosed herein.

Electrochemical stability was assessed by preforming linear sweep voltammetry (LSV). Using lithium metal as counter, reference and working electrodes (Li/Li$^+$). The voltage was swept from 0 to 6 V vs. open circuit voltage at a 10 mV/s scan rate or as disclosed herein.

Thermal stability of the samples was analyzed using thermogravimetric analysis (TGA), using a nitrogen atmosphere, temperature range of 15° C. to 350° C., and a scan rate of 10° C./min or as disclosed herein.

Example 1

Synthesis of Comparison Membrane Electrolyte, GN/LiTFSI/PAN

The following materials were used in the synthesis of the GN/LiTFSI/PAN membranes: succinonitrile (99%+, Alfa Aesar, Haverhill, Mass., United States of America), glutaronitrile (99%, Alfa Aesar), lithium bis(trifluoromethylsulfonyl)-imide (LiTFSI, 98%+, Alfa Aesar), polyacrylonitrile (PAN, MW 150,000. Sigma Aldrich, St. Louis, Mo., United States of America) and dimethylformamide (DMF, Fisher Chemical, Hampton, N.H., United States of America).

A SN electrolyte solution was prepared by melting SN at 60° C. and adding LiTFSI sufficient to produce a 1 M LiTFSI solution.

A GN electrolyte solution was created by mixing an appropriate amount of LiTFSI with melted GN sufficient to produce a 1 M LiTFSI solution.

A 15% PAN/DMF solution was poured into silicon rubber molds, and the appropriate amount of the SN/GN electrolyte solution(s) was drop casted onto the polymer to create a final 2:1 PAN solution to electrolyte ratio. The mixture was dried under vacuum for 1 hour at room temperature to ensure the release of all solvent. The effect of glutaronitrile was evaluated using the following membranes:

0% GN (SN/LiTFSI/PAN)
5% GN (5% GN+95% SN/LiTFSI/PAN)
10% GN (10% GN+90% SN/LiTFSI/PAN)
50% GN (50% GN+50% SN/LiTFSI/PAN)
90% GN (10% GN+90% SN/LiTFSI/PAN)
100% GN (GN/LiTFSI/PAN)

Results and Discussion

Each of GN/LiTFSI/PAN and SN/LiTFSI/PAN electrolyte membranes, were free standing, transparent, and flexible. Each membrane, although dry to the touch, released some liquid electrolyte solution when pressure was applied.

The solid electrolyte membranes, with varying ratios of SN and GN, all exhibited similar flake-like morphology in SEM imaging. Although were some differences in flake size, the differences were negligible.

EDS was used to analyze the distribution of fluorine (in LiTFSI) and the distribution through the PAN polymer was found to be uniform.

Based on analysis of the samples (via Arrhenius plots), the ionic conductivity of the LiTFSI membranes was generally shown to increase with rising temperature. The membrane comprising 100% glutaronitrile [GN/LiTFSI/PAN] achieved the highest ionic conductivity of $1.57 \times 10^{-3}$ S/cm at 20.6° C. Overall, membranes containing 0%-90% GN reached higher ionic conductivity and exhibited a general trend of increasing conductivity with GN concentration at 30.9° C., 40.9° C., and 50.9° C. The concentration of GN had a higher impact on ionic conductivity at concentrations between 5% and 50%.

Half-cell cycling was used to evaluate the relative cycling performances of the membranes containing varying amounts of GN. Differential scanning calorimetry shed light on the thermal stability of the various membranes. Linear sweep voltammetry provided an analysis of the electrochemical window of the various membranes and the impact of GN concentration.

Example 2A

Synthesis of Membrane Electrolyte without Filler

Prep Solution 1 M LiPF$_6$/GN/PAN/EC

Polyacrylonitrile (PAN, MW 150,000, Sigma Aldrich) was added to melted ethylene carbonate (EC, 99%, melting point 34-37° C., Sigma-Aldrich) to form a 12% solution (12% PAN in EC) The mixture was stirred using a magnetic stirrer at 70° C. for 3 hours. Next, 5.4 wt % lithium hexafluorophosphate (LiPF$_6$, 99%, Sigma-Aldrich) was dissolved in 3 g melted EC. The LiPF$_6$/EC solution was added to the 12% PAN/EC mixture (resulting in an overall 6% PAN in EC concentration) and stirred at 70° C. for 1 hour. Finally, 24 wt % of glutaronitrile (GN, 99%, Alfa Aesar) was added and the solution was stirred at the same conditions for an additional hour.

Prep Solution 1.5 M LiPF$_6$/GN/PAN/EC

The preparation of a 1.5 M LiPF$_6$/GN/PAN/EC solution followed the method described above, using 8.1 wt % LiPF$_6$ dissolved in 3 g melted EC in place of a solution comprising 5.4 wt % LiPF$_6$ in 3 g EC. All other steps remained unchanged.

Casting of Electrolyte Membrane without Filler

Each LiPF$_6$/PAN/GN/EC mixture was cast onto aluminum foil using a doctor blade with a 45 µm gap. The cast electrolyte was dried for 12 hours at ambient temperature while exposed to the atmosphere. While there was some variation in thickness, each prepared was typically 45-50 µm.

The solid electrolyte membrane was stored in Petri dish in an Argon glovebox.

Coin Cell Preparation

Lithium titanate Li$_4$Ti$_5$O$_{12}$ (LTO, MTI Corporation, Richmond, Calif., United States of America) electrodes were prepared using an 8:1:1 ratio of the active material, LTO, with carbon black (3 wt. % Super C65, Timcal Imerys, Québec, Canada) and polyvinylidene fluoride (3 wt. % PVDF, Solvay), in 1-methyl-2-pyrrolidinone (NMP, ≥99.5%, Aldrich). Each electrode slurry was cast on 7 µm thick battery grade Al foil using a doctor blade and a vacuum drawdown coater to yield consistent loading per unit area of active material. The laminates were first dried slowly at atmospheric pressure and room temperature, then dried further at 110° C. under vacuum for 10 hrs.

Coin cells 2032 (Linyi Gelon LIB Co., Ltd., Linyi, Shandong, China) were assembled using the LTO electrode prepared above as the cathode, lithium metal (0.25 mm thickness) as the anode, a C480 separator (Celgard, Charlotte, N.C., United States of America) and the solid electrolyte membrane prepared from $LiPF_6$/PAN/GN/EC described above.

A control cell was prepared as described above, substituting $LiPF_6$/PAN/GN/EC with a liquid electrolyte, 1 M $LiPF_6$/EC/DEC, where EC:DEC was used at a 1:1 volume ratio.

After preparation, the coin cells were left to sit in a cycler at room temperature for 10 hours.

Battery Performance Testing

Figure 5A:
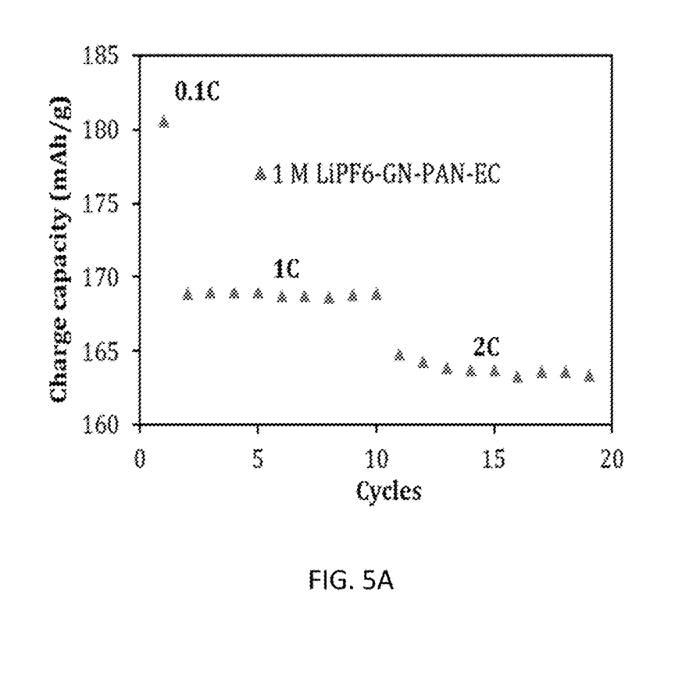
FIG. 5A is a graph of the charge capacity (mAh/g) vs cycles 0-20 of a coin cell comprising a solid electrolyte membrane prepared from 1 M $LiPF_6$/GN/PAN/EC, a cathode of lithium titanate $Li_4Ti_5O_{12}$ (LTO), and an anode of lithium metal; cycled at current rates of 0.1 C, 1 C and 2 C using a voltage window of 1.2 V to 2.4 V measured at 23° C. (grey triangles). A control half-cell comprising 1 M $LiPF_6$/EC/DEC 1:1 vol with C480 separator was used for comparison.

Each coin cell was cycled at current rates of 0.1 C, 1 C and 2 C using a voltage window of 1.2 V to 2.4 V (see FIG. 5A).

Example 2B

Synthesis of Membrane Electrolyte with Filler

Prep Solution 1 M $LiPF_6$/GN/PAN/EC

1 M $LiPF_6$/GN/PAN/EC solution was prepared as described above.

Prep Solution 1.5 M $LiPF_6$/GN/PAN/EC 1.5 M $LiPF_6$/GN/PAN/EC solution was prepared as described above.

Addition of Filler

A filler, 3 wt % of $Al_2O_3$ (99.8%, 13 nm, Sigma Aldrich), was separately mixed with each $LiPF_6$/GN/PAN/EC solution via ball milling, i.e. using a ball milling machine comprising a yttrium-stabilized zirconium (YSZ) jar and YSZ media, having an average size of around 5 mm diameter, in a ratio of about 3:1 solution:ball mass. The ball milling machine was run for about 30 minutes at about 800 RPM.

Casting Electrolyte Membrane with Filler

Each $LiPF_6$/GN/PAN/EC/$Al_2O_3$ mixture was then cast onto aluminum foil using a doctor blade. Each cast electrolyte was dried for 12 hours at ambient temperature while exposed to the atmosphere. While there was some variation in thickness, each prepared solid electrolyte membrane was typically 45-50 μm. The membranes were stored in a Petri dish in an Argon glovebox.

Coin Cell Preparation

The cathode material slurry was prepared using 94 wt. % $LiNi_{0.6}Mn_{0.2}Co_{0.2}O_2$ (NMC622) active material (Umicore/Palm Commodities International La Vergne, Tennessee, United States of America), 3 wt. % carbon black filler (Super C65, Timcal Imerys,) and 3 wt. % polyvinylidene fluoride binder (Solvay), in 1-methyl-2-pyrrolidinone (99.5%, Aldrich).

The anode material slurry was prepared using 94 wt. % artificial graphite (MTI Corporation), 2 wt % conductive carbon (Timcal Imerys), 2 wt % carboxymethyl cellulose (CMC) binder (MTI Corporation) and 2 wt % Styrene-Butadiene Rubber (SBR) binder (MTI Corporation).

To achieve consistent loading per unit area of active material, the cathode slurry was cast on 7 μm thick battery grade Al foil using a doctor blade and a vacuum drawdown coater and the anode slurry was cast onto 14 μm thick battery grade Cu foil using a doctor blade and a vacuum drawdown. Each laminate was first dried slowly at atmospheric pressure and room temperature, then dried further at 110° C. under vacuum for 10 hrs. Then the electrodes were punched into 19 mm diameter circles.

Coin cells 2032 (Linyi Gelon LIB Co., Ltd.,) were assembled using the cathode, anode, a C480 separator (Celgard) and the solid electrolyte membrane prepared from $LiPF_6$/GN/PAN/EC/$Al_2O_3$ as described above.

Pouch Cell Preparation

The cathode material slurry was prepared using 94 wt % NMC622 active material (Umicore/Palm Commodities International) mixed with 3 wt. % carbon black filler (Super C65, Timcal Imerys) and 3 wt. % PVDF binder (3 wt. %, Solvay), in 1-methyl-2-pyrrolidinone (99.5%, Aldrich).

The anode material slurry was prepared using 94 wt % of artificial graphite (MTI Corporation), 2 wt % conductive carbon (Timcal Imerys), 2 wt % CMC binder (MTI Corporation,) and 2 wt % SBR binder (MTI Corporation).

To achieve consistent loading per unit area of active material, the cathode slurry was cast on 7 μm thick battery grade Al foil using a doctor blade and a vacuum drawdown coater and the anode slurry was cast onto 14 μm thick battery grade Cu foil using a doctor blade and a vacuum drawdown. Each laminate was first dried slowly at atmospheric pressure and room temperature, then dried further at 110° C. under vacuum for 10 hrs.

The electrodes were then cut into rectangular pieces: the cathode cut 26×38 mm and the anode cut 28×40 mm. A 4 mm aluminum tab (MTI Corporation) was ultrasonically welded onto the cathode piece and a 4 mm nickel tab (MTI Corporation) was ultrasonically welded onto the anode piece. The electrodes were then moved into the argon glovebox for pouch cell assembly.

Inside the glove box, a 32×44 mm piece of the solid electrolyte membrane was placed atop the anode and the cathode placed atop the membrane. The assembly was then sandwiched between four ethyl vinyl acetate layers (30× 42×1 mm sheets (two sheets on each side of lamination plastic, Staples). The whole complex was wrapped with 40×100 mm C480 separator (Celgard). The ends of the assembled cell were taped with Kapton tape, and it was placed in an aluminum laminated pouch cell case (110 mm×110 mm, MTI Corporation). Each side of the pouch cell was sealed using an 8" Manual Hand Sealer (heat sealing, Yescom, City Of Industry, Calif., United States). The pouch was then transferred out of the glovebox and vacuum sealed using a VacMaster VP210 (VacMaster, Overland Park, Kans., United States of America).

The pouch cells were left to sit in the cycler at ambient conditions (room temperature) for 10 hrs.

Battery Performance Testing

Each cell, both coin cell and pouch cell configurations, was tested at 0.1 C formation and 0.3 C cycling. All testing was conducted at room temperature.

Results and Discussion

Figure 1A:
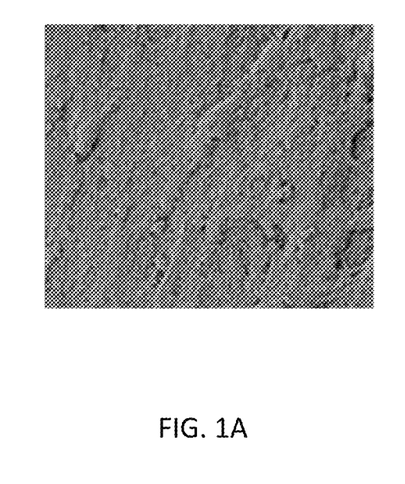
FIG. 1A is a scanning electron micrograph (SEM) image of a solid electrolyte membrane prepared from 1 M $LiPF_6$/GN/PAN/EC as disclosed herein at 1,000× magnification, wherein $LiPF_6$ is lithium hexafluorophosphate, GN is glutaronitrile, PAN is polyacrylonitrile, and EC is ethylene carbonate.
Figure 1B:
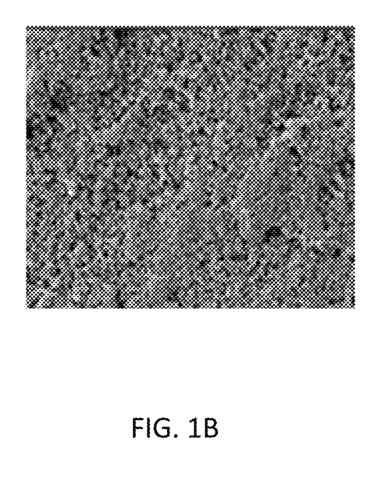
FIG. 1B is an SEM image of a solid electrolyte membrane prepared from 1 M $LiPF_6$/GN/PAN/EC as disclosed herein at 5,000× magnification.
Figure 1C:
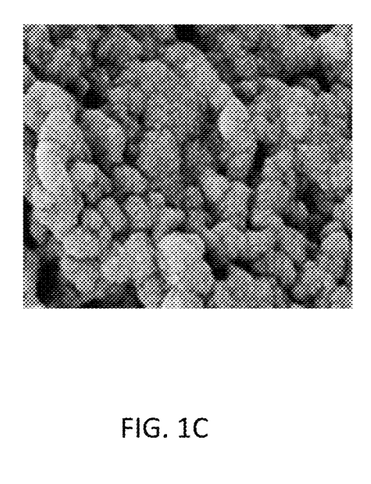
FIG. 1C is an SEM image of a solid electrolyte membrane prepared from 1 M $LiPF_6$/GN/PAN/EC as disclosed herein at 50,000× magnification.
Figure 2:
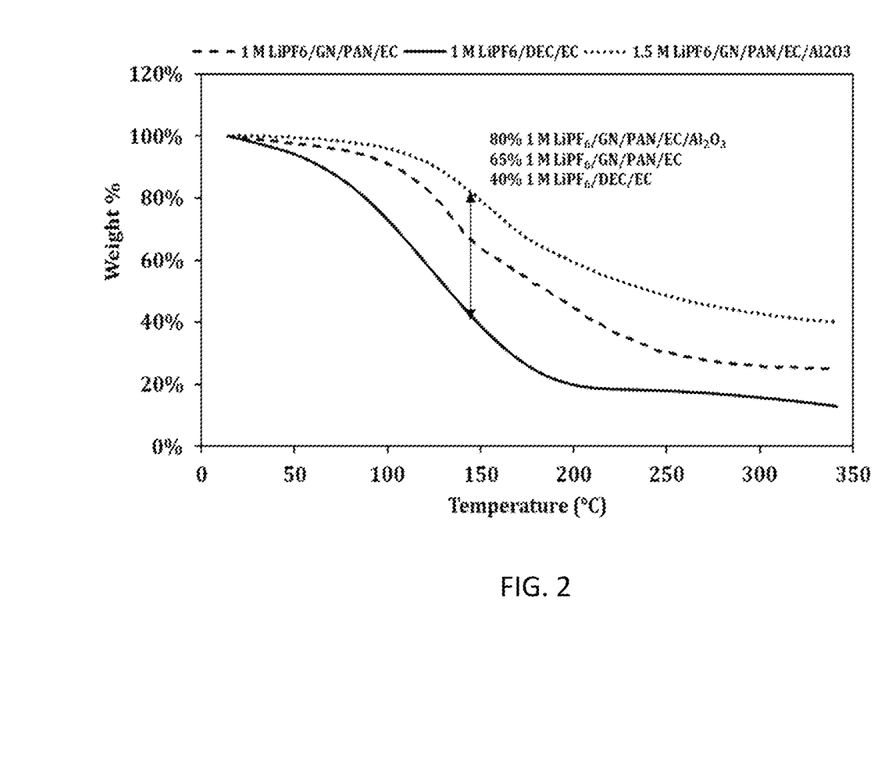
FIG. 2 is a graph of weight percent change as a function of temperature in a thermogravimetric analysis under a nitrogen atmosphere, at a temperature range of 15° C. to 350° C., at a scan rate of 10° C./min of a solid electrolyte membrane prepared from 1 M $LiPF_6$/GN/PAN/EC (dashed line), a solid electrolyte membrane prepared from 1 M $LiPF_6$/GN/PAN/EC/$Al_2O_3$ (dotted line), and a polyethylene separator soaked in 1 M $LiPF_6$/DEC/EC (solid line, control sample (EC is ethylene carbonate and DEC is diethyl carbonate)).

Thermogravimetric analysis (FIG. 2) was conducted under a nitrogen atmosphere, at a temperature range of 15° C. to 350° C., and a scan rate of 10° C./min. $LiPF_6$/GN/PAN/EC, containing no filler $AL_2O_3$, was thermally stable up to 115° C.; the addition of alumina filler ($LiPF_6$/GN/PAN/EC/$Al_2O_3$) increased the thermal stability to 123° C. At 150° C., a sample of $LiPF_6$/GN/PAN/EC/$Al_2O_3$ maintained 80% of its weight, while the control sample of $LiPF_6$/DEC/EC soaked polyethylene separator maintained only 40% of its weight. Thus, $LiPF_6$/GN/PAN/EC/$Al_2O_3$ was demonstrated to have the highest thermal stability followed by $LiPF_6$/GN/PAN/EC; the liquid electrolyte, $LiPF_6$/DEC/EC showed the lowest thermal stability. Thermal stability is a useful measure of electrolyte safety, as a more thermally stable electrolyte is less likely to ignite during a short circuit.

Figure 3A:
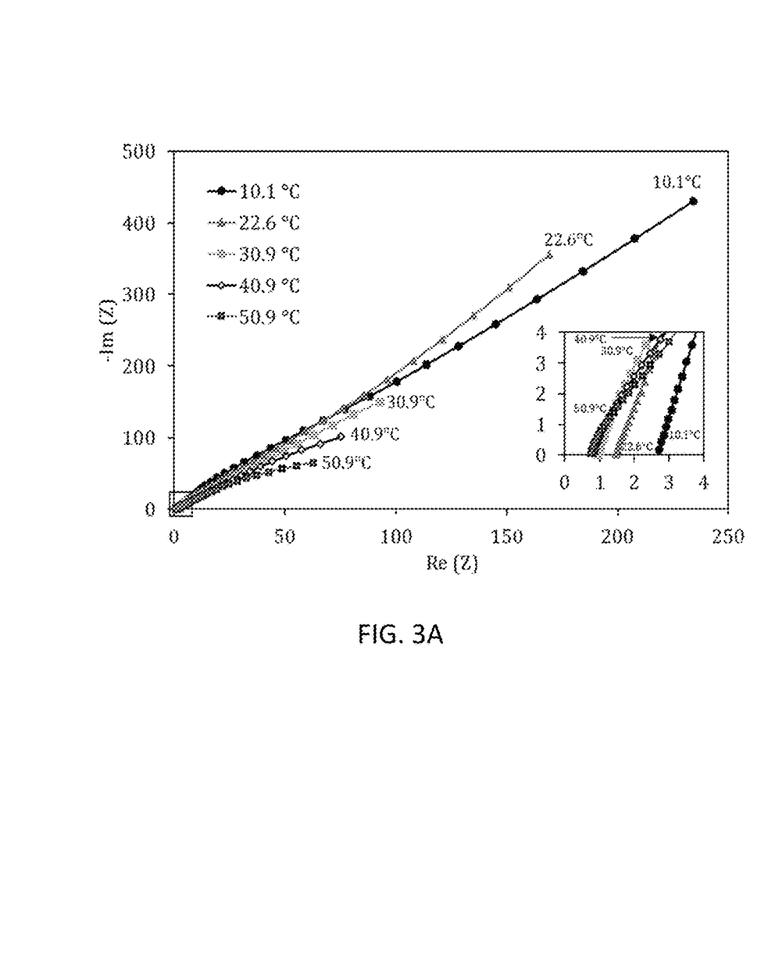
FIG. 3A is a Nyquist plot of ionic conductivity of a 50 µm solid electrolyte membrane prepared from 1 M $LiPF_6$/GN/PAN/EC using electrochemical impedance spectroscopy (EIS) in a frequency range of 10 Hz-1 MHz and a voltage amplitude of 100 mV, using two gold coated copper electrodes.

The ionic conductivity of a solid electrolyte membrane prepared from 1 M $LiPF_6$/GN/PAN/EC in a frequency range of 10 Hz-1 MHz and a voltage amplitude of 100 mV, using two gold coated copper electrodes showed the low bulk resistance of the samples. As shown in FIG. 3A, resistance decreased with temperature.

Figure 3B:
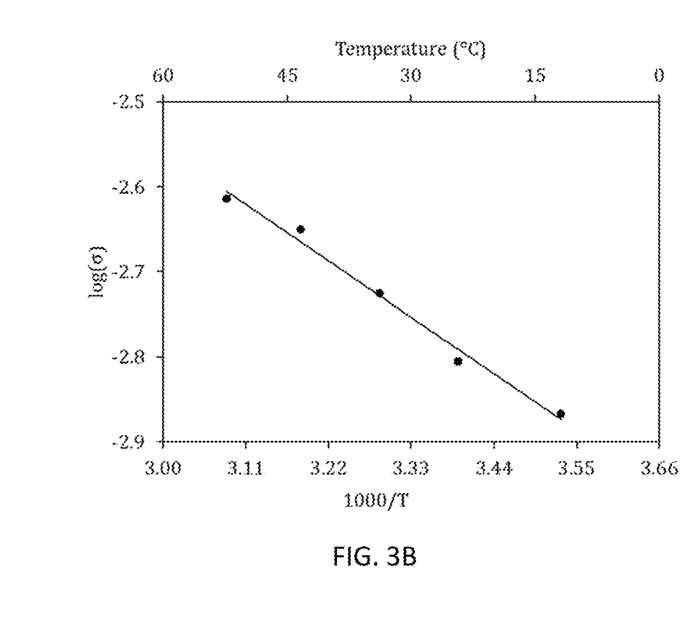
FIG. 3B is an Arrhenius plot (log (a) vs 1000/T) of a solid electrolyte membrane prepared from 1 M $LiPF_6$/GN/PAN/EC.

FIG. 3B is an Arrhenius plot (log (σ) vs 1000/T) of a solid electrolyte membrane prepared from 1 M $LiPF_6$/GN/PAN/EC. The linear plot shows the Arrhenius relationship between temperature and ionic conductivity for the membrane electrolyte, which is similar to liquid electrolyte.

Figure 4:
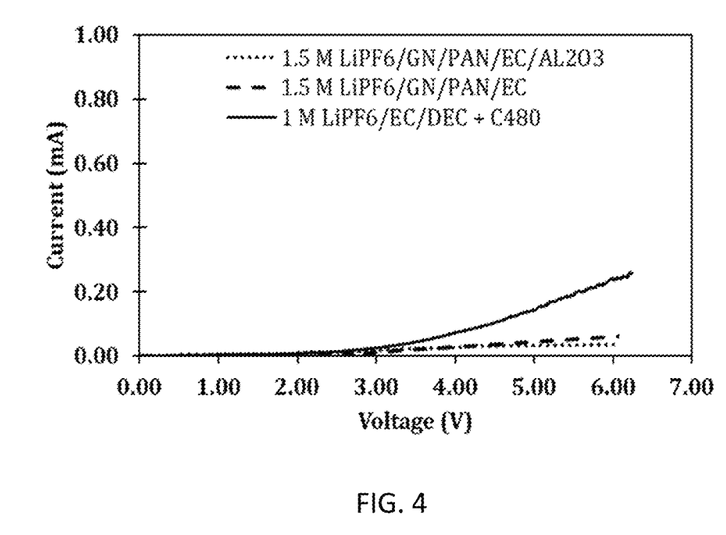
FIG. 4 is a graph of electrochemical stability of a coin cell comprising a solid electrolyte membrane prepared from 1M $LiPF_6$/GN/PAN/EC with and without $Al_2O_3$ and two lithium metal (0.25 mm thickness) using linear sweep voltammetry (LSV) vs. Li/Li+ compared to a liquid electrolyte (1 M $LiPF_6$/DEC/EC). Lithium metal was used as counter, reference and working electrodes. The voltage was swept from 0 to 6 V vs. open circuit voltage at a 10 mV/s scan rate. A reference coin cell had the same components, with substitution of 1 M $LiPF_6$/EC/DEC 1:1 vol soaked C480 separator.

One concern in the preparation and use of batteries is the degradation (oxidation or reduction) of electrolyte. The electrochemical stability (FIG. 4) of a solid electrolyte membrane prepared from $LiPF_6$/GN/PAN/EC/$Al_2O_3$ was greater than that of a solid electrolyte membrane prepared from $LiPF_6$/GN/PAN/EC, and each of the solid electrolyte membranes had better stability than the liquid control ($LiPF_6$/DEC/EC) when measured 0 V to 6 V vs. open circuit voltage at a 10 mV/s scan rate. As shown, ceramic filler, e.g. $Al_2O_3$ particles, enhanced the electrochemical stability of the solid electrolyte membrane.

Figure 5B:
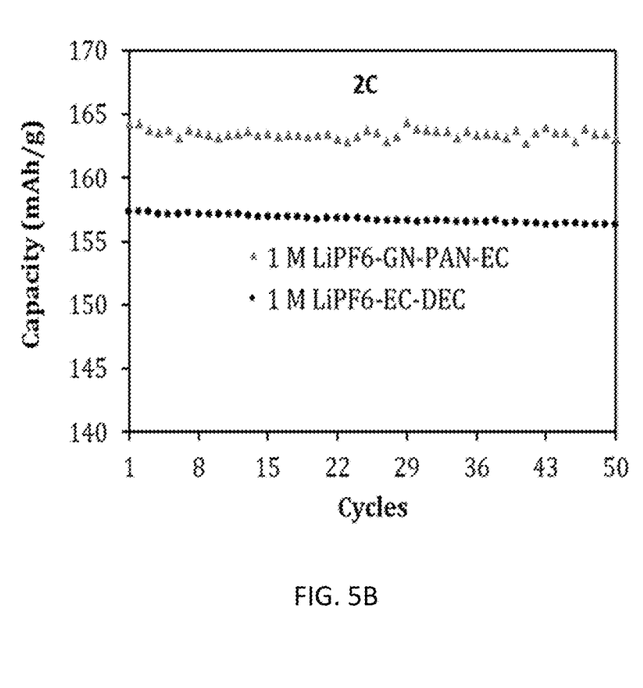
FIG. 5B is a graph of the charge capacity (mAh/g) vs cycles 1-50 of the above-referenced LTO half cell (grey triangles) and the above-referenced control half-cell (black circles) at 2 C.
Figure 5C:
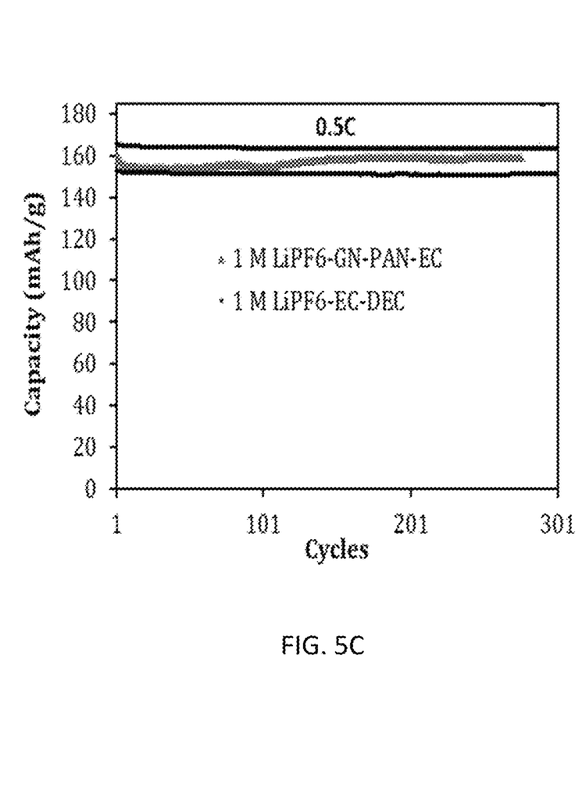
FIG. 5C is a graph of the charge capacity (mAh/g) vs cycles 1-301 of the above-referenced LTO half cell (grey triangles) and the above-referenced control half-cell (black circles) at 0.5 C.
Figure 5D:
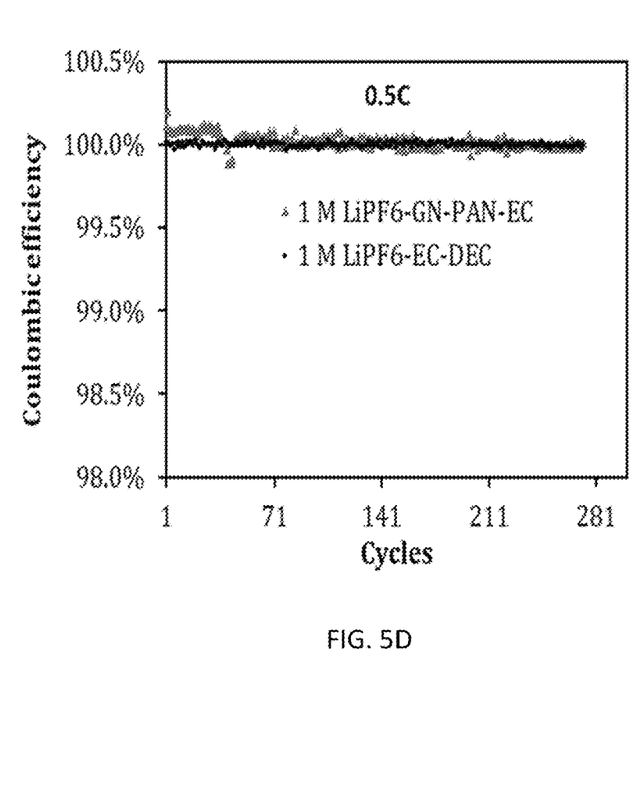
FIG. 5D is graph of the Coloumbic efficiency vs cycles 1-281 of the above-referenced LTO half cell (grey triangles) and the above-referenced control half-cell (black circles) at 0.5 C.

The characteristics of a half cell comprising the solid electrolyte membrane prepared from $LiPF_6$/GN/PAN/EC was compared to characteristics of a half cell comprising liquid electrolyte ($LiPF_6$/EC/DEC). In particular, the charge capacity of the solid electrolyte membrane prepared from $LiPF_6$/GN/PAN/EC was higher (~162 mAh/g) than the liquid electrolyte (~157 mAh/g) over 50 cycles (FIG. 5B). The charge capacity of the solid electrolyte membrane for cycles 1-301 was shown to fall within the range of capacity achieved with a liquid electrolyte (FIG. 5C) and the Coloumbic efficiency was roughly equivalent for the two samples (FIG. 5D).

Figure 6A:
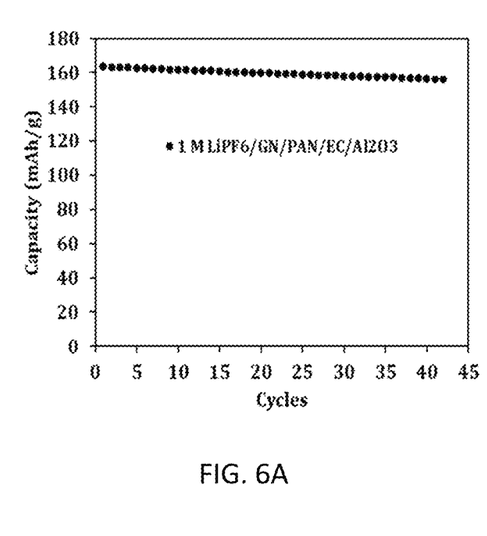
FIG. 6A is a graph of the charge capacity (mAh/g) vs cycles 1-45 at 0.3 C at a temperature of 23° C. for a pouch full-cell assembled with a solid electrolyte membrane prepared from 1.5 M $LiPF_6$/GN/PAN/EC/$Al_2O_3$, using $LiNi_{0.6}Mn_{0.2}Co_{0.2}O_2$ (NMC622) as the cathode and graphite as the anode.
Figure 6B:
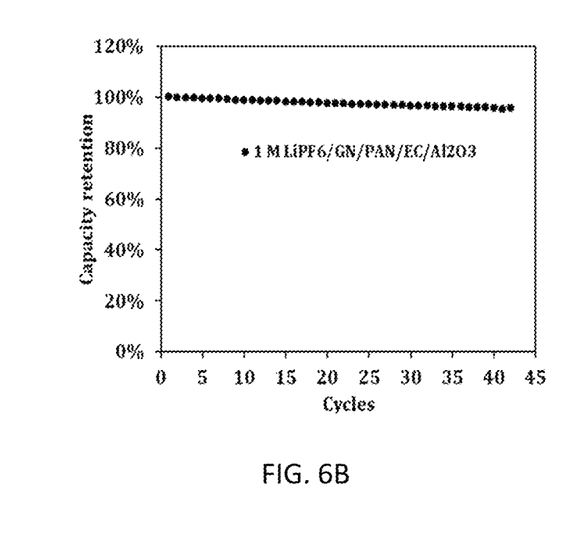
FIG. 6B is a graph of the capacity retention vs cycles 1-45 at 0.3 C at 23° C. for the above-referenced pouch full-cell.

As shown in FIGS. 6A and 6B, the full cell cycling for a pouch cell comprising $LiPF_6$/GN/PAN/EC/$Al_2O_3$ demonstrated capacity of 160 mAh/g while maintaining high capacity retention (>95%) even after 40 cycles.

As shown herein, glutaronitrile was used in the preparation of highly ionically conductive and free standing solid electrolyte membrane using a non-polarizable lithium salt. The electrolytes prepared according to the methods disclosed herein were sturdy, flexible and exhibited high ionic conductivity ($1.36 \times 10^{-3}$ S $cm^{-1}$ at 22.6° C.). In the absence of filler, e.g. $AL_2O_3$, the membrane was thermally stable up to 115° C.; the addition of alumina filler increased the thermal stability to 123° C. The electrolytes were electrochemically stable from 0 to 6 V and, as exemplified with LTO half-cells, have comparable, if not better, capacities than liquid electrolyte cells. In addition, the electrolytes of the presently disclosed subject matter exhibit stable cycling at room temperature even at high current rates.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A solid electrolyte membrane consisting of a single layer comprising glutaronitrile, a nitrile-containing polymer, and about 2.5 weight (wt.) % to about 15 wt. % of a non-polarizable lithium salt, and wherein said solid electrolyte membrane does not comprise a polarizable lithium salt and is free of succinonitrile.

2. The solid electrolyte membrane of claim 1, wherein the non-polarizable lithium salt is one or more salts selected from the group consisting of lithium hexafluorophosphate, lithium tetrafluoroborate, and lithium perchlorate.

3. The solid electrolyte membrane of claim 2, wherein the non-polarizable lithium salt is lithium hexafluorophosphate.

4. The solid electrolyte membrane of claim 1, wherein the nitrile-containing polymer is polyacrylonitrile (PAN).

5. The solid electrolyte membrane of claim 4, wherein said solid electrolyte membrane has an ionic conductivity of at least about $1 \times 10^{-3}$ S $cm^{-1}$ at 22.6° C.

6. The solid electrolyte membrane of claim 1, further comprising one or more fillers selected from the group consisting of $Li_{1.3}Al_{0.3}Ti_{1.7}(PO_4)_3$, $Li_{1.5}Al_{0.5}Ge_{1.5}(PO_4)_3$, $Li_7La_3Zr_2O_{12}$, $Li_{0.33}La_{0.557}TiO_3$, $Li_2O$—$SiO_2$—$TiO_2$—$P_2O_5$, $Al_2O_3$, $SiO_2$, $TiO_2$, $BaTiO_3$, $Ta_2O_5$, $ZrO_2$, $Si_3N_4$, SiC, $PbTiO_3$, $LiNbO_3$, AlN, and $Y_2O_3$.

7. The solid electrolyte membrane of claim 6, wherein the one or more fillers are selected from the group consisting of $Li_{1.3}Al_{0.3}Ti_{1.7}(PO_4)_3$, $Li_{1.5}Al_{0.5}Ge_{1.5}(PO_4)_3$, $Li_7La_3Zr_2O_{12}$, $Li_{0.33}La_{0.557}TiO_3$, and $Li_2O$—$SiO_2$—$TiO_2$—$P_2O_5$.

8. The solid electrolyte membrane of claim 6, wherein the one or more fillers are selected from the group consisting of $Al_2O_3$, $SiO_2$, $TiO_2$, $BaTiO_3$, $Ta_2O_5$, $ZrO_2$, $Si_3N_4$, SiC, $PbTiO_3$, $LiNbO_3$, AlN, and $Y_2O_3$.

9. The solid electrolyte membrane of claim 8, wherein the one or more fillers are selected from the group consisting of $SiO_2$, $TiO_2$, and $Al_2O_3$.

10. The solid electrolyte membrane of claim 1, wherein the solid electrolyte membrane is no more than 50 μm thick.

11. The solid electrolyte membrane of claim 1, wherein the solid electrolyte membrane comprises between about 5 wt. % and about 35 wt. % glutaronitrile and wherein the nitrile-containing polymer is polyacrylonitrile (PAN).

12. The solid electrolyte membrane of claim 11, wherein the solid electrolyte membrane comprises between about 15 wt. % and about 25 wt. % glutaronitrile, and the non-polarizable lithium salt is $LiPF_6$.

13. The solid electrolyte membrane of claim 1, wherein the solid electrolyte membrane further comprises ethylene carbonate.

14. A battery comprising the solid electrolyte membrane of claim 13, a positive electrode, and a negative electrode.

15. The solid electrolyte membrane of claim 1, wherein the solid electrolyte membrane consists of glutaronitrile, $LiPF_6$, polyacrylonitrile, and ethylene carbonate.

* * * * *